United States Patent [19]

Taylor

[11] 3,732,937
[45] May 15, 1973

[54] WEIGHT SCALE FOR BAG PACKER

[76] Inventor: Murland L. Taylor, 2521 Washington, Parsons, Kans.

[22] Filed: Aug. 9, 1971

[21] Appl. No.: 170,264

[52] U.S. Cl. ......................177/68, 177/74, 177/118
[51] Int. Cl. ..............................................G01g 13/02
[58] Field of Search...................177/68, 74, 80, 118

[56] References Cited

UNITED STATES PATENTS

| | | | |
|---|---|---|---|
| 3,095,056 | 6/1963 | Vredenburg | 177/68 |
| 915,941 | 3/1909 | Davis | 177/68 |
| 2,883,140 | 4/1959 | Stafford | 177/68 |
| 3,042,127 | 7/1962 | Charley | 177/68 |

*Primary Examiner*—George H. Miller, Jr.
*Attorney*—Bradley & Wharton

[57] ABSTRACT

Apparatus for delivering a predetermined weight of material to a receptacle therefor utilizes a pair of rotatable scale beams with poises disposed on the beams. A scale is included on the face of each beam thus allowing the effective counterweight of the poises to be divided between the beams and the scales on each beam to be divided into relatively small weight increments for increased accuracy. The beams are rotated about an axis when the weight of the filled receptacle exceeds the effective counterweight of the poises. The major portion of the weight of both the filled receptacle and the poises is always below the axis of rotation of the beams to assure that the center of gravity of the forces acting on the beam is always below this axis. This results in an inherent damping effect on any swinging movement of the beams and eliminates the need for a separate damping mechanism. The material delivered to the receptacle passes through a control opening which is closed by a swingable gate in response to rotation of the beams when the predetermined weight is reached.

12 Claims, 7 Drawing Figures

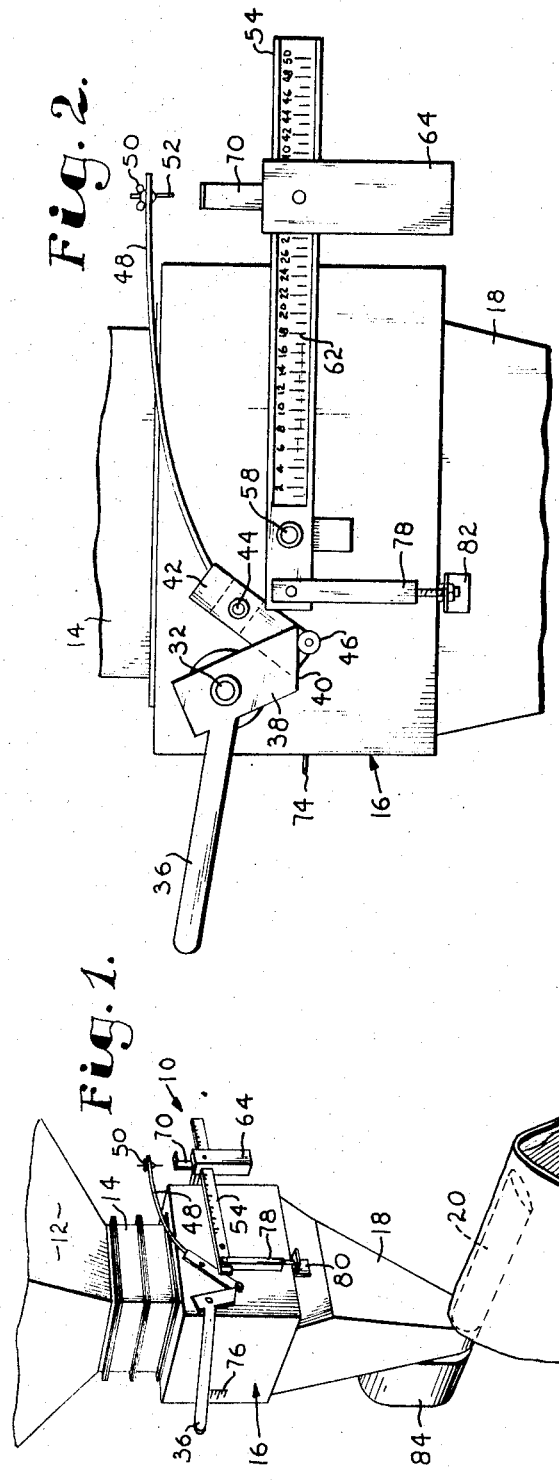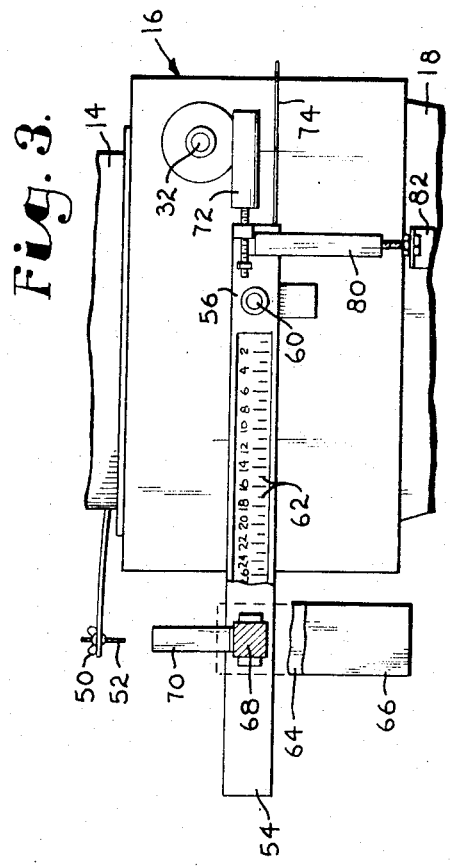

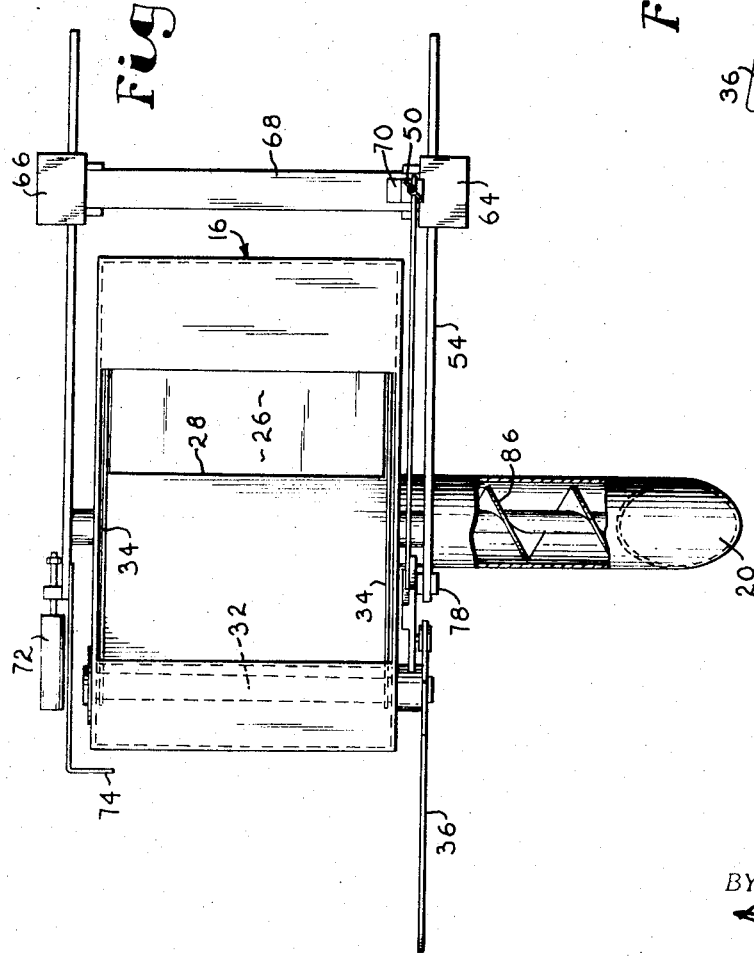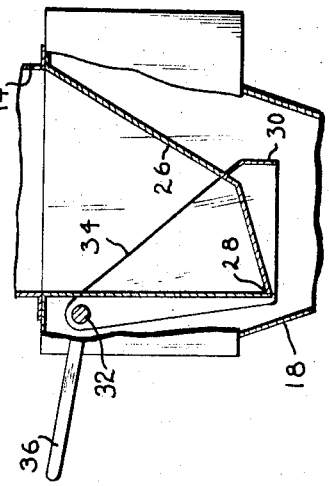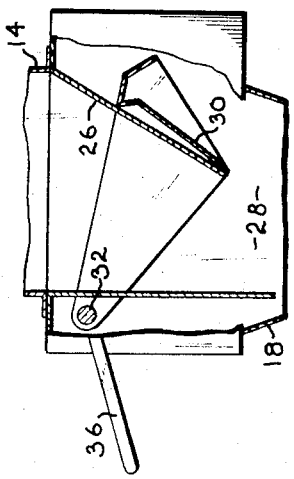

WEIGHT SCALE FOR BAG PACKER

This invention relates to weighing devices and, more particularly, to apparatus for delivering a predetermined weight of material to a receptacle.

In many industrial applications it is necessary to repeatedly deliver a predetermined weight of material to a receptacle therefor. Particularly in the food processing and agricultural industries material is delivered to bags in a predetermined weight for shipping and storage. Since the material is normally sold on a weight basis, it is important that the weight of the filled bags be both accurate and uniform.

Prior devices for filling a bag with a predetermined weight of material have utilized tail weights disposed on a hanger at the end of a beam for providing a predetermined counterweight which is balanced by the predetermined weight of material delivered to a receptacle. The tail weights normally can be purchased in only limited sizes thus restricting the accuracy of the weighing device to the smallest possible size tail weight which can be purchased. In addition, the tail weights, which must be removed from their hanger assembly whenever it is desired to vary the weight, frequently become chipped, broken or lost thus further limiting the accuracy of the weighing device. It has also been found necessary when utilizing the so-called tail weights to employ a damping mechanism to restrict swinging movement of the scale beam as the quantity of material introduced into the receptacle approaches the predetermined weight.

It is therefore an object of the present invention to provide apparatus for delivering a predetermined weight of material to a receptacle wherein the accuracy of the predetermined weight of material is greatly increased over the prior art devices by using a linear scale graduated along the length of the scale beam and with a poise which is movable along the beam to any one of a infinite number of positions.

As a corollary to the above object, an objective of this invention is to provide apparatus for delivering a predetermined weight of material to a receptacle wherein a second scale beam is also graduated along its length and has a second poise positioned on it whereby the predetermined effective counterweight of the poises is divided between two relatively large linear scales thus allowing the scales to be graduated in relatively small weight increments without limiting the overall predetermined effective counterweight which can be provided.

A very important aim of this invention is also to provide apparatus for delivering a predetermined weight of material to a receptacle therefor wherein the receptacle is disposed at one end of a rotatable scale beam and a counterweight is disposed at the other end of the scale beam with the major portion of the weight of both the filled receptacle and the counterweight always being below the axis of rotation of the scale beam thereby providing an inherent damping effect which eliminates the need for an auxiliary damping mechanism.

As a corollary to the preceding object, an aim of this invention is to provide counterweights on the scale beams which are mounted on the beams to preclude any swinging movement of the weights when the beam rotates thereby further enhancing the damping effect.

My invention also has as one of its objects the provision of apparatus for delivering a predetermined weight of material to a receptacle therefor wherein the effective counterweight comprises a poise disposed on a scale beam with the poise movable relative to the beam for varying the effective counterweight to thereby eliminate the need for removing the counterweight at any time and thus substantially removing the danger of the counterweight becoming chipped or damaged to any extent which would affect its accuracy.

Still another aim of my invention is to provide apparatus for delivering a predetermined weight of material as described in the foregoing objects wherein is included on one of the scale beams a threadably received fine adjustment weight for further increasing the accuracy of the predetermined weight of material which is to be delivered.

In the drawings:

FIG. 1 is a perspective view of the apparatus of the present invention as employed with a valve bag packer;

FIG. 2 is an enlarged, fragmentary elevational view of one side of the apparatus shown in FIG. 1 illustrating details of the apparatus which delivers a predetermined weight of material;

FIG. 3 is an enlarged, fragmentary elevational view of the opposite side of the apparatus from that shown in FIG. 2;

FIG. 4 is an enlarged top plan view of the apparatus with portions broken away;

FIG. 5 is a side elevational view on a slightly reduced scale illustrating the position of the scale beam as it rotates to close the control gate after the predetermined quantity of material has been delivered to the receptacle;

FIG. 6 is a side elevational view similar to FIG. 5 with major portions broken away to illustrate the position of the control gate when it is closing the delivery opening; and FIG. 7 is a side elevational view similar to FIG. 6 and again with major portions broken away to illustrate the control opening when the gate is swung upwardly to allow material to pass through the opening.

Referring initially to FIG. 1, the apparatus of the present invention is designated generally by the numeral 10 and is shown coupled with an overhead hopper 12 by a rectangular collar 14. The apparatus 10 comprises an uppermost housing designated generally by the numeral 16 and having an opening in the top thereof for communication with the opening at the lowermost end of the hopper 12. Disposed beneath the housing 16 is a hopper chamber 18 having a laterally extending tubular arm 20 for delivering material received from the hopper 12 to a receptacle such as a valve bag 22 telescopically received by and supported on the arm 20 and positioned above a conveyor belt 24.

Referring additionally to FIGS. 2, 3 and 6, it is seen that the housing 16 encloses a funnel-shaped delivery structure 26 having a control opening 28 at the bottom thereof which is closed by a control gate 30. The control gate 30 is rigidly coupled with a rotatable shaft 32 by a pair of depending bracket supports 34 which are integral with the gate 30 and keyed to the shaft 32. The shaft 32 can be rotated by a lever arm 36 which projects radially of the shaft on the outside of the housing 16. The end of the lever arm 36 which is adjacent the shaft 32 merges into an integral plate 38 having a tapered surface 40 for purposes to be made clear hereinafter.

Also disposed on the outside of the housing 16 is a plate 42 which is mounted for rotation by a shaft 44 that is rotatably mounted on the housing 16. The plate 42 mounts a roller 46 at its lowermost end which is movable along the surface 40. Also carried by the plate 42 and extending therefrom in a direction away from the lever arm 36 is a trip arm 48 having a wing nut 50 and a threadably received adjusting screw 52 disposed adjacent one end.

Disposed at opposite sides of the housing 16 are a pair of elongated scale beams 54 and 56 which are rotatably mounted by shafts 58 and 60 respectively, which shafts have a common axis of rotation. Each of the beams 54 and 56 is provided with a graduated linear scale 62 and telescopically received on the beams 54 and 56 for sliding movement relative thereto are a pair of poises 64 and 66 respectively. The two beams 54 and 56 are rigidly interconnected for simultaneous movement by a tie bar 68. Disposed on the tie bar 68 adjacent the beam 54 is a trip lever 70 which is engageable, upon rotation of the beam 54 with the screw 52 at the end of the trip arm 48. Threadably mounted at one end of the beam 56 is a fine adjustment weight 72, and immediately beneath the weight 72 is an L-shaped indicator 74 which extends around one corner of the housing 16 to cooperate with a scale 76 (visible in FIG. 1) to indicate when a predetermined weight of material has been delivered to the bag 22.

Also carried by the beams 54 and 56 on the side of the common axis of the shafts 58 and 60 which is opposite the side where the poises 64 and 66 are positioned, are a pair of hangers 78 and 80. The hangers 78 and 80 support the hopper chamber 18 by virtue of brackets 82 disposed on opposite sides of the chamber 18. Manifestly, the hangers 78 and 80 also support the bag 22 and the material received therein when the bag is telescoped over the arm 20.

As illustrated in FIG. 1, a housing 84 is disposed at the bottom of the hopper chamber 18 and it is to be understood that a power source such as a conventional electrical motor would be enclosed within the housing 84. Such a motor would operate an auger 86 (FIG. 4) disposed in the arm 20 to move material from the chamber 18 to the bag 22.

In operation, the poises 64 and 66 are first moved along the beams 54 and 56 until the total effective counterweight of the poises as indicated by the scales 62 is equal to the predetermined weight of material which it is desired to deliver to the bag 22. It is to be noted that since the total counterweight is divided between the two beams 54 and 56, the scales 62 can be graduated in relatively small weight increments for optimum accuracy in placing the poises 64 and 66. For example, as shown in FIGS. 2 and 3, the beams 54 and 56 can be graduated in one pound increments to a total of fifty pounds on each beam and a total effective counterweight of 100 pounds. The one pound increments on the scales 62 can also be subdivided to further increase the degrees of accuracy. Since the poises 64 and 66 are movable relative to the beams 54 and 56 to an infinite number of positions, the effective counterweight and therefore the predetermined weight of material can be varied in any increment desired.

With the poises 64 and 66 in position to present the effective counterweight corresponding to the predetermined weight of material to be delivered, the lever 36 is pulled downwardly by an operator to the position illustrated in FIG. 7 thereby moving the control gate 30 upwardly to allow material to pass through the opening 28. When the arm 36 is moved downwardly the surface 40 will move relative to the roller 46 until the latter is free to move under the influence of gravity, to the latching position illustrated in FIG. 5 to hold the gate 30 open.

As the material passes through the opening 28 and is moved from the chamber 18 by the auger 86 into the bag 22, the net weight of the bag 22 will gradually increase. When the predetermined weight to be delivered is approached, there is some tendency for the beams 54 and 56 to rotate about their common axis in a swinging motion. An important feature of the apparatus 10 is the fact that the major portion of the weight of the poises 64 and 66 as well as the weight of the filled bag 22 is always below the axis of rotation of the beams 54 and 56 as defined by the shafts 58 and 60. This assures that the center of gravity of the forces acting on the beams will always be below the axis of rotation and results in an inherent damping effect which minimizes the swinging movement of the beams and eliminates the need for an auxiliary damping mechanism. In this regard, it is highly desirable that the poises 64 and 66 be disposed on the beams 54 and 56 so that any swinging movement of the poises during rotation of the beams is absolutely precluded. This assures that there will be no shifting of the center of gravity because of movement of the poises and further enhances the damping effect.

Once the weight of the material delivered plus the weight of the supporting structure exceeds the effective counterweight presented by the poises 64 and 66, the beams 54 and 56 will rotate about the shafts 58 and 60 to move the trip lever 70 into engagement with the trip arm 48 as indicated in FIG. 5, to thereby cause the roller 46 to move from its latching position to a position beneath the surface 40 whereby the gate 30 gravitates to its closed position again blocking the opening 28. Rotational movement of the beams 54 and 56 will result in a corresponding movement of the indicator 74 to its zero position on the scale 76 thus providing an operator of the apparatus 10 with a visual indication that the desired quantity of the material has been delivered. Filling of the bag 22 and rotation of the beams 54 and 56 also lowers the bag 22 onto the conveyor surface 24 for automatic removal of the bag from the arm 20. Removal occurs as the bag 22 is lowered and the conveyor surface 24 is raised into engagement therewith. Appropriate power mechanism (not shown) then moves the conveyor in a horizontal plane to slide the bag off arm 20.

Manifestly, the apparatus 10 should be periodically checked to confirm that the indicator 74 occupies the zero position on the scale 76 when no weight is on the beams 54 and 56 other than the weight of the bag 22 and the supporting structure. When minor adjustment of the apparatus is required to reestablish the zero point, this is accomplished by moving the threadably received weight 72 to either increase or decrease the tare which is always acting on the beams 54 and 56.

Having thus described the invention, what is claimed as new and desired to be secured by Letters Patent is:

1. Apparatus for delivering a predetermined weight of material to a receptacle therefor, said apparatus comprising:

delivery structure having an opening therein through which said material passes;

an elongated beam disposed adjacent said structure and mounted for rotation about an axis perpendicular to the plane of the longitudinal dimension of the beam, said receptacle being adapted to be supported by said beam at one side of said axis to receive material passing through said opening with the major portion of the weight of the receptacle when filled with said material being beneath the horizontal plane of said axis;

a poise disposed on said beam on the other side of said axis to present an effective weight corresponding to said predetermined weight with the major portion of the weight of the poise being beneath the horizontal plane of said axis; and movable closure means mounted within said delivery structure and operable upon rotation of said beam, in response to the weight of the filled receptacle exceeding the effective weight of said poise, to gravitationally move to close said opening and thereby stop the passage of material into said receptacle.

2. The invention of claim 1, wherein said beam is disposed on one side of said structure, said apparatus including a second elongated beam disposed on the opposite side of said structure for rotation about said axis, said receptacle being adapted to be partially supported by each of said beams at one side of the axis of rotation of the beams; and a second poise disposed on said second beam at the other side of said axis to exert a portion of said effective force, the major portion of the weight of said second poise being beneath the horizontal plane of said axis.

3. The invention of claim 2, wherein is included means interconnecting said beams for synchronized movement.

4. The invention of claim 2, wherein is included a chamber disposed beneath said opening and having a laterally extending tubular arm; and auger means disposed in said arm operable to remove said material from the chamber, said receptacle comprising a valve bag adapted to be telescoped over said arm to receive said material removed by said auger means.

5. The invention of claim 1, wherein said poise is securely mounted on said beam at a preselected position to preclude movement of the poise relative to the beam when the beam rotates.

6. The invention of claim 5, wherein said poise is adjustably movable relative to said beam for varying the effective weight of the poise.

7. The invention of claim 6, wherein said beam is graduated to present a scale for indicating said effective weight.

8. The invention of claim 1, wherein said means for closing the opening comprises a gate swingable about an axis; said apparatus including lever means for moving said gate to an open position; and latch means for holding said gate against the forces of gravity in said open position until the gate is closed upon rotation of said beam.

9. The invention of claim 8, wherein is included a trip lever coupled with one of said beams; and a trip arm mounting said latch means, said trip arm being engageable by said trip lever for moving said latch means from its holding position to effect closing of said gate.

10. The invention of claim 9, wherein is included a fine adjustment weight threadably mounted on one of said beams at said one side of said axis.

11. The invention of claim 10, wherein is included an indicator arm coupled with one of said beams on said one side of said axis for providing a visual indication to an operator of the apparatus that said predetermined weight of material has been delivered to said receptacle.

12. Apparatus for delivering a predetermined weight of material to a receptacle therefor, said apparatus comprising:

a delivery chute having an opening therein through which said material passes;

first and second elongated scale beams rigidly interconnected and mounted on opposite sides of said delivery chute for rotation about an axis perpendicular to the longitudinal dimensions of the beams, said receptacle being adapted to be supported by said beams at one side of said axis to receive material passing through said opening with the major portion of the receptacle when filled with said material being beneath the horizontal plane of said axis;

first and second movable poises disposed on said first and second beams respectively on the other side of said axis to present an effective weight corresponding to said predetermined weight with the major portion of the weight of the poises being beneath the horizontal place of said axis, said beams being graduated to present a scale and said poises being telescopically received on the beams and adjustably movable to preselected positions thereon for varying the effective weight, said poises being securely fixed to the beams at any preselected position to preclude movement of said poises during rotation of said beams;

a gate swingable about an axis upon rotation of said beams in response to the weight of the filled receptacle exceeding the effective weight of said poises to close said opening and thereby stop the passage of material into said receptacle;

lever means for moving said gate to an open position; and latch means for holding said gate in the open position until the gate is closed upon rotation of said beams.

* * * * *